(12) United States Patent
Kazerani et al.

(10) Patent No.: US 8,738,766 B1
(45) Date of Patent: May 27, 2014

(54) END-TO-END MONITORING AND OPTIMIZATION OF A CONTENT DELIVERY NETWORK USING ANYCAST ROUTING

(75) Inventors: Alexander A. Kazerani, Santa Monica, CA (US); Amir Khakpour, Los Angeles, CA (US)

(73) Assignee: EdgeCast Networks, Inc., Santa Monica, CA (US)

( * ) Notice: Subject to any disclaimer, the term of this patent is extended or adjusted under 35 U.S.C. 154(b) by 301 days.

(21) Appl. No.: 13/286,486

(22) Filed: Nov. 1, 2011

(51) Int. Cl.
*G06F 15/173* (2006.01)

(52) U.S. Cl.
USPC ............ 709/224; 709/238; 709/226; 709/231

(58) Field of Classification Search
None
See application file for complete search history.

(56) References Cited

U.S. PATENT DOCUMENTS

| | | | |
|---|---|---|---|
| 5,233,604 A | 8/1993 | Ahmadi et al. | |
| 5,732,219 A | 3/1998 | Blumer et al. | |
| 5,991,735 A | 11/1999 | Gerace | |
| 6,006,260 A | 12/1999 | Barrick, Jr. et al. | |
| 6,014,660 A | 1/2000 | Lim et al. | |
| 6,108,703 A | 8/2000 | Leighton et al. | |
| 6,130,890 A | 10/2000 | Leinwand et al. | |
| 6,134,592 A | 10/2000 | Montulli | |
| 6,185,598 B1 | 2/2001 | Farber et al. | |
| 6,272,598 B1 | 8/2001 | Arlitt et al. | |
| 6,275,470 B1 | 8/2001 | Ricciulli | |
| 6,415,280 B1 | 7/2002 | Farber et al. | |
| 6,415,323 B1 | 7/2002 | McCanne et al. | |
| 6,415,368 B1 | 7/2002 | Glance et al. | |
| 6,438,592 B1 | 8/2002 | Killian | |
| 6,463,508 B1 | 10/2002 | Wolf et al. | |
| 6,553,413 B1 | 4/2003 | Leighton et al. | |
| 6,728,767 B1 | 4/2004 | Day et al. | |
| 6,799,221 B1 | 9/2004 | Kenner et al. | |
| 6,829,654 B1 | 12/2004 | Jungck | |
| 6,993,590 B1 | 1/2006 | Gauthier et al. | |
| 7,003,555 B1 | 2/2006 | Jungck | |
| 7,086,061 B1 | 8/2006 | Joshi et al. | |
| 7,103,645 B2 | 9/2006 | Leighton et al. | |
| 7,574,499 B1 * | 8/2009 | Swildens et al. | 709/223 |
| 7,631,098 B2 | 12/2009 | Boutboul et al. | |
| 7,765,295 B2 | 7/2010 | Anastas et al. | |
| 7,953,887 B2 | 5/2011 | Boss et al. | |
| 8,370,449 B2 * | 2/2013 | Harvell et al. | 709/214 |
| 2002/0163882 A1 * | 11/2002 | Bornstein et al. | 370/227 |
| 2003/0115421 A1 | 6/2003 | McHenry et al. | |

(Continued)

OTHER PUBLICATIONS

Contavalli, et al., "Client IP information in DNS requests", Internet-Draft document draft-vandergaast-edns-clientip-01, May 21, 2010, 24 pages.

*Primary Examiner* — Mohamed Ibrahim
(74) *Attorney, Agent, or Firm* — Los Angeles Patent Group; Arman Katiraei

(57) ABSTRACT

Some embodiments implement systems and methods to monitor CDN performance from the end user's perspective. To achieve full end-to-end monitoring, the systems and methods monitor the performance of Anycast routing for routing an end user to the optimal PoP of the CDN and monitor the performance of different routes that deliver content from the optimally selected PoP back to the end user. Systems and methods are also provided to leverage the monitored performance in order to automatically optimize the performance of the CDN by optimizing or modifying Anycast routing and by performing route grooming as needed to ensure that the optimal route is selected to deliver content to different sets of end users that request content from a particular PoP.

19 Claims, 13 Drawing Sheets

(56) References Cited

U.S. PATENT DOCUMENTS

| | | |
|---|---|---|
| 2004/0078481 A1 | 4/2004 | Rudd et al. |
| 2005/0021863 A1 | 1/2005 | Jungck |
| 2005/0188073 A1 | 8/2005 | Nakamichi et al. |
| 2006/0031537 A1 | 2/2006 | Boutboul et al. |
| 2006/0112170 A1 | 5/2006 | Sirkin |
| 2008/0008089 A1* | 1/2008 | Bornstein et al. ............. 370/227 |
| 2008/0139197 A1 | 6/2008 | Misra et al. |
| 2008/0313350 A1 | 12/2008 | Swinton et al. |
| 2009/0172192 A1 | 7/2009 | Christian et al. |
| 2009/0177778 A1 | 7/2009 | Turk |
| 2009/0210513 A1 | 8/2009 | Boss et al. |
| 2009/0248786 A1* | 10/2009 | Richardson et al. .......... 709/201 |
| 2010/0098072 A1 | 4/2010 | Satterlee et al. |
| 2010/0146038 A1 | 6/2010 | Hajiaghayi et al. |
| 2010/0153802 A1 | 6/2010 | Van Der Merwe et al. |
| 2010/0265846 A1 | 10/2010 | Weniger |
| 2011/0082916 A1* | 4/2011 | Swanson et al. .............. 709/219 |
| 2011/0149987 A1 | 6/2011 | Satterlee et al. |
| 2012/0023198 A1* | 1/2012 | Swanson et al. .............. 709/218 |

\* cited by examiner

| AS Number | AS Description | Anycast Median Delay (ms) | Anycast Average Delay (ms) | Anycast STD Delay (ms) | Data Points | Anycast Delay Rank |
|---|---|---|---|---|---|---|
| 1 AS33651 | Comcast Cable Communications, Inc. | 219.5 | 222.6 | 87.84 | 20 | 2.7 |
| 2 AS20001 | Road Runner HoldCo LLC | 103.5 | 132.44 | 78.66 | 16 | 1.31 |
| 3 AS7132 | AT&T Internet Services | 198.5 | 279.17 | 189.77 | 12 | 1.75 |
| 4 AS22773 | Cox Communications Inc. | 105.5 | 147 | 117.61 | 4 | 2.75 |
| 5 AS701 | MCI Communications Services, Inc. d/b/a Verizon Business | 211 | 211 | 11.31 | 2 | 1.5 |
| 6 AS5068 | ClearBlue Technologies | 1858.5 | 1858.5 | 112.43 | 2 | 1 |
| 7 AS19262 | Verizon Online LLC | 489 | 489 | 0 | 1 | 6 |
| 8 AS6461 | MFN - Metromedia Fiber Network | 532 | 532 | 0 | 1 | 1 |
| 9 AS25751 | Valueclick, Inc. | 53 | 53 | 0 | 1 | 1 |
| 10 AS20115 | Charter Communications | 49 | 49 | 0 | 1 | 1 |
| 11 AS19397 | ACN | 73 | 73 | 0 | 1 | 1 |

| AS Number | AS Description | Data Point Count | Default | GBLX | nLayer | NTT | Telia |
|---|---|---|---|---|---|---|---|
| 1 AS174 | Cogent/PSI | 35 | 30 | 28 | (26) | 29 | 27 |
| 2 AS7132 | AT&T Internet Services | 32 | 337 | 377 | 367 | 394 | (358) |
| 3 AS33651 | Comcast Cable Communications, Inc. | 27 | 226 | (209) | 224 | 267 | 239 |
| 4 AS20001 | Road Runner HoldCo LLC | 22 | 249 | 284 | 319 | (256) | 309 |
| 5 AS19262 | Verizon Online LLC | 18 | 146 | 133 | (124) | 138 | 128 |
| 6 AS8151 | Uninet S.A. de C.V. | 18 | 373 | 437 | 458 | (427) | 452 |
| 7 AS22394 | Cellco Partnership DBA Verizon Wireless | 16 | 504.5 | 574 | 619 | (547) | 582 |
| 8 AS33490 | Comcast Cable Communications, Inc. | 12 | 219.5 | 297 | (283) | 306 | 298 |
| 9 AS38623 | ISP/IXP IN CAMBODIA WITH THE BEST SERVICE IN THERE. | 6 | 1016 | 1072 | 1109 | (1037) | 1156 |
| 10 AS701 | MCI Communications Services, Inc. d/b/a Verizon Business | 5 | 281.5 | 242 | 344 | (180) | 235 |
| 11 AS7303 | Telecom Argentina S.A. | 5 | 976.5 | 1157 | 1144 | 1111 | (835) |
| 12 AS36149 | Hawaiian Telcom Services Company, Inc. | 4 | 234 | 346 | (312) | 363 | 333 |
| 13 AS209 | Qwest Communications Company, LLC | 4 | 267 | 271 | 260 | 262 | (237) |
| 14 AS11492 | CABLE ONE, INC. | 3 | 204 | (223) | 230 | 256 | 239 |
| 15 AS32284 | Bashas' Inc. | 3 | 413.5 | 465 | 556 | (419) | 874 |
| 16 AS14259 | Gtd Internet S.A. | 2 | 317 | 576 | 572 | 577 | (526) |
| 17 AS22047 | BANDA ANCHA S.A. | 2 | 362 | (756) | 842 | 809 | 764 |
| 18 AS16586 | Clearwire US LLC | 2 | 258.5 | 321 | 552 | 316 | (315) |
| 19 AS3605 | Guam Cablevision, LLC. | 1 | 760 | 729 | (701) | 741 | 716 |
| 20 AS10507 | Sprint Personal Communications Systems | 1 | 280 | 437 | 517 | (415) | 466 |
| 21 AS16817 | BRIGHT HOUSE NETWORKS, LLC | 1 | 211 | 194 | (181) | 204 | 187 |
| 22 AS7829 | Nextweb, Inc | 1 | 212 | 114 | 127 | (82) | 116 |

END-TO-END MONITORING AND OPTIMIZATION OF A CONTENT DELIVERY NETWORK USING ANYCAST ROUTING

TECHNICAL FIELD

The present invention relates to a content delivery network (CDN) and more specifically, to techniques to monitor and optimize the CDN.

BACKGROUND ART

Content delivery networks (CDNs) have greatly improved the way content is transferred across data networks such as the Internet. A CDN accelerates the delivery of content by reducing the distance that content travels in order to reach a destination. To do so, the CDN strategically locates surrogate origin servers, also referred to as caching servers or edge servers, at various points-of-presence (PoPs) that are geographically proximate to large numbers of content consumers and the CDN utilizes a traffic management system to route requests for content hosted by the CDN to the edge server that can optimally deliver the requested content to the content consumer. As used hereafter optimal delivery of content refers to the most efficient available means with which content can be delivered from a server to an end user machine over a data network. Optimal delivery of content can be quantified in terms of latency, jitter, packet loss, distance, and overall end user experience.

Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content provider deliver the requested content. For example, a CDN may locate edge servers in Los Angeles, Dallas, and New York. These edge servers may cache content that is published by a particular content provider with an origin server in Miami. When a content consumer in San Francisco submits a request for the published content, the CDN will deliver the content from the Los Angeles edge server on behalf of the content provider as opposed to the much greater distance that would be required when delivering the content from the origin server in Miami. In this manner, the CDN reduces the latency, jitter, and amount of buffering that is experienced by the content consumer. The CDN also allows the content provider to offload infrastructure, configuration, and maintenance costs while still having the ability to rapidly scale resources as needed. Content providers can therefore devote more time to the creation of content and less time to the creation of an infrastructure that delivers the created content to the content consumers.

As a result of these and other benefits, many different CDNs are in operation today. Edgecast, Akamai, Limelight, and CDNetworks are some examples of operating CDNs. One of the key differentiators between the CDNs is performance. Based on routing techniques, number of PoPs, load, etc., some CDNs are able to consistently provide better performance when delivering content to end users than other CDNs. The improved performance may be on the order of tens or hundreds of milliseconds. For certain content, such as streaming content, the improved performance can make a noticeable difference for the end user experience. This performance difference can also be a determinant factor as to whether an end user completes a commercial transaction, subscribes for a service or content, or stays on the site of one content provider or visits a site of another content provider.

To differentiate itself from other CDNs on the basis of performance, Edgecast utilizes Anycast routing. Anycast is a routing methodology that is well known in the art in which a content request is routed to the topologically nearest PoP from a group of PoPs that are all identified with the same destination address, wherein each PoP of the group of PoPs contains at least one server that can serve the content requested by the end user. In this manner, Edgecast resolves end user requests to servers within its CDN that can optimally serve the requested content to the end user.

While use of Anycast routing within the Edgecast CDN has proven to provide performance improvements over other routing methodologies used by other CDNs, the decentralized and distributed control over Anycast routing renders existing monitoring tools unsuitable for Anycast performance analysis. To accurately monitor Anycast performance in a CDN environment, it is necessary to derive performance results from the perspective of the CDN end users, as it may be the case that in certain scenarios Anycast routing does not produce optimal routing for certain end users that request content from the CDN. For example, servers of a first PoP being routed to by Anycast routing may deliver content to some end users less optimally than servers of a second PoP.

Furthermore, a fully optimized CDN is one that is optimized from end-to-end. End-to-end optimization involves optimizing the entire end user experience from the routing of the end user to an optimal PoP to the optimized delivery of the requested content from the optimal PoP to the end user. The latter portion of the end user experience depends partly on the ability of a transit provider or peering neighbor connecting the PoP to the end user to deliver the content in an efficient manner. A CDN can utilize the routes of different transit providers and the routes of different peering neighbors to connect to the end users. The different routes are subject to different loads, bandwidth, delay, packet loss, etc. Therefore, to fully optimize the CDN service, it is necessary to monitor the performance of the different routes and to select the route that delivers content from a particular PoP of the CDN to a particular end user in the most efficient manner.

Accordingly, there is a need to monitor Anycast performance in a CDN to identify optimization opportunities for the CDN whereby content delivery from the CDN to the end user can be improved in terms of one or more of latency, jitter, packet loss, distance, and overall end user experience. Specifically, there is a need to perform such monitoring from the end users perspective in order to ascertain whether the Anycast selected PoP or server is the optimal PoP or server for the end user and to optimize Anycast routing when the selected PoP or server is not optimally selected by Anycast routing. There is further a need to monitor the performance of the different transit provider routes and the different peering neighbor routes connecting end users to the CDN services and to select the most efficient route for delivering content from different PoPs to different sets of end users.

SUMMARY OF THE INVENTION

It is an object of the embodiments described herein to perform end-to-end performance monitoring for a content delivery network (CDN) or any other service provider that provide a content delivery service from distributed network locations. To this end, it is an object to monitor the performance of Anycast routing as it relates directly to the end users utilizing the services of the CDN. Furthermore, it is an object to monitor the content delivery performance of the CDN on different transit provider routes and peering neighbor routes. It is also an object to leverage the performance monitoring results to optimize the performance of the CDN to resolve performance issues directly experienced by one or more end users.

To achieve these and other objects, some embodiments implement systems and methods to monitor CDN performance from the end user's perspective. To achieve full end-to-end monitoring, the systems and methods monitor the performance of Anycast routing for routing an end user to the optimal PoP of the CDN and monitor the performance of different routes that deliver content from the selected optimal PoP back to the end user. More specifically, the monitoring determines whether the Anycast selected PoP is the optimal PoP for serving content to a particular end user and for identifying whether a route used by the selected PoP to deliver content to the particular end user is the optimal route. Systems and methods are also provided to leverage the monitored performance in order to automatically optimize the performance of the CDN by optimizing or modifying Anycast routing and by performing route grooming as needed to ensure that the optimal route is selected to deliver content to different sets of end users that request content from a particular PoP. In some embodiments, the optimal route includes a route that is selected from routes of different transit providers and peering neighbors that connect the particular PoP to the sets of end users.

To perform the performance monitoring, some embodiments embed monitoring code into various content that is served from (1) the PoPs of the CDN or (2) CDN partners that agree to embed the monitoring code into content that is served from their independently controlled servers. CDN partners may include content providers that operate one or more servers independent of the CDN and specialized monitoring servers of a third party monitoring service as some examples. When content embedded with the monitoring code is downloaded and processed by an end user machine, the monitoring code causes the end user machine to derive end-to-end performance results for the CDN and to report the results back to a monitoring server at which point the performance results can be analyzed to identify optimization opportunities for the CDN. The monitoring server may be operated by the CDN or by a third party monitoring service.

The monitoring code includes instructions to cause the end user machine to contact a location identification service in order to identify a location for the end user machine. The monitoring code further includes instructions to cause the end user machine to download a beacon object from a PoP of the CDN that is identified as a result of Anycast routing and to download the same beacon object from a set of geographically proximate PoPs of the CDN that is identified based on the identified location of the end user machine. The monitoring code further includes instructions to cause the end user machine to measure the time to download the beacon object from the Anycast PoP and each PoP of the set of geographically proximate PoPs. Other performance monitoring may also be performed when downloading the beacon object, for example, to determine whether the end user machine is blocked from accessing the Anycast PoP that is addressed using an Anycast address. The time measurements and other monitoring results are then reported from the end user machine to the monitoring server for analysis in determining whether Anycast routing routes the end user to the optimal PoP and whether Anycast routing is blocked for certain end users.

In some embodiments, the embedded code further includes instructions for monitoring the performance of different routes that a particular PoP can use to serve the beacon object to the end user machine. The routes include routes provided by different transit providers that fully or partially connect the particular PoP to the end user machine. Additionally, the routes include the routes of zero or more peering neighbors that fully or partially connect the particular PoP to the end user machine. The monitoring code causes the end user machine to download the beacon object from the particular PoP using different routes and to measure the time it takes to download the beacon object using each of the different routes from that particular PoP. The end user machine reports the measurements to the monitoring server for analysis in determining whether the default route or route normally used to deliver content to a particular end user or group of end users is optimal or whether an alternate route should be used when delivering content from the particular PoP to the particular end user or group of end users.

In this manner, the monitoring server, over time, accumulates an expansive set of monitoring data from which optimizations to the Anycast routing and route selection can be made. These optimizations include implementing rules that (1) modify Anycast routing to certain over-utilized or under-utilized PoPs, (2) modify Anycast routing for perceived traffic patterns at different times (e.g., day, week, season, etc.), or (3) modify Anycast routing for certain content types (e.g., use Anycast routing to resolve requests for streaming content and use static routing to resolve request for small objects). In some embodiments, the optimizations include route grooming to select the optimal route from multiple transit provider routes and from zero or more peering neighbor routes over which to optimally serve content to an end user or group of end users.

BRIEF DESCRIPTION OF THE DRAWINGS

In order to achieve a better understanding of the nature of the present invention, preferred embodiments for end-to-end CDN performance monitoring and optimization will now be described, by way of example only, with reference to the accompanying drawings in which:

FIGS. 4-5 illustrate some of the reports that are generated by the monitoring server in accordance with some embodiments based on end user derived Anycast performance monitoring results.

FIGS. 8-9 illustrate some of the reports that are generated by the monitoring server in accordance with some embodiments based on end user derived route performance monitoring results.

DETAILED DESCRIPTION

In the following detailed description, numerous details, examples, and embodiments for systems and methods for end-to-end content delivery network (CDN) performance monitoring and optimization are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

Figure 1:
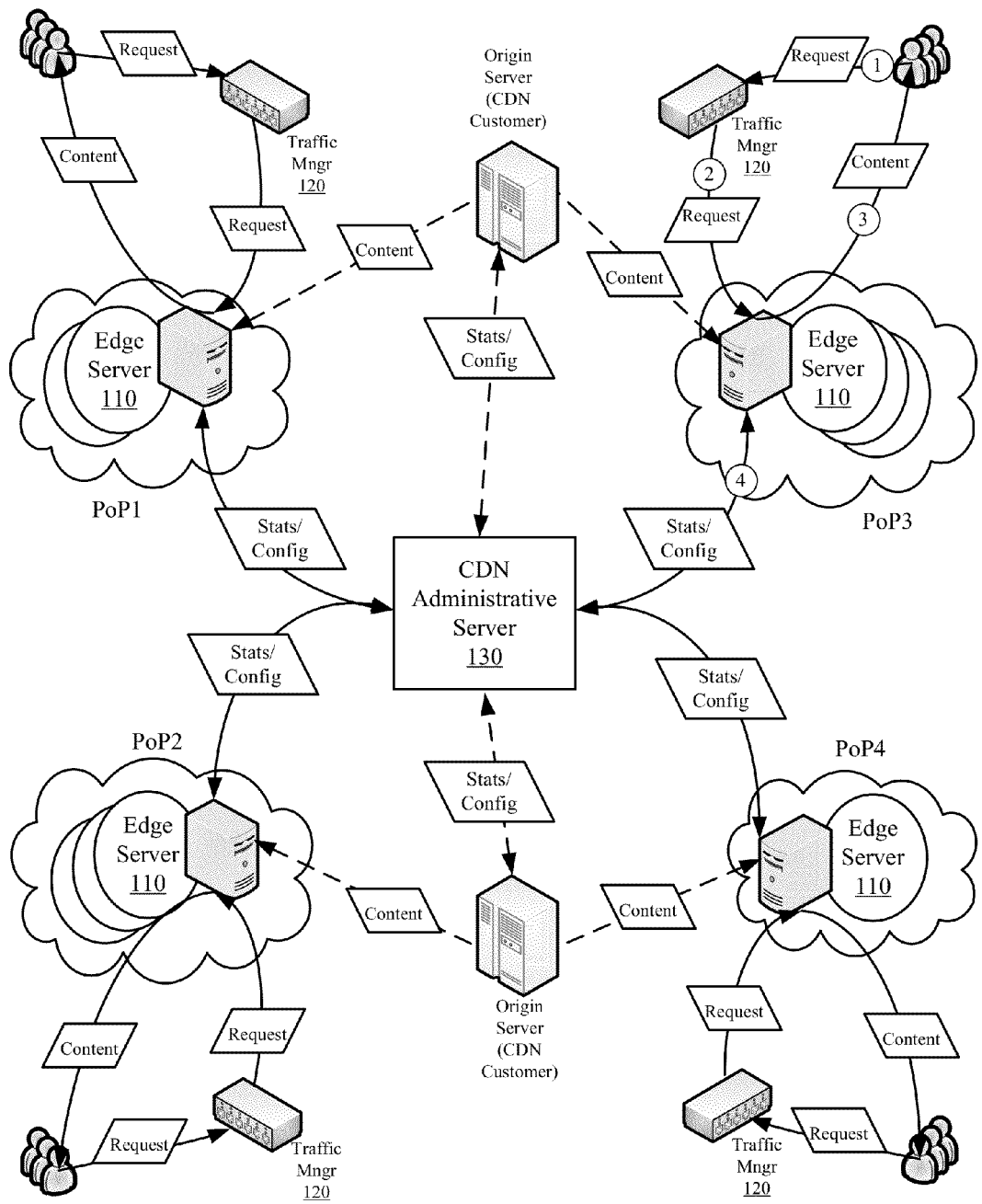
FIG. 1 presents an overview of an exemplary CDN infrastructure in accordance with some embodiments.

To aid in the discussion below, an overview of an exemplary CDN infrastructure is presented in FIG. 1. As shown in FIG. 1, the infrastructure includes a distributed set of edge servers 110, traffic management servers 120, and an administrative server 130. The figure also illustrates the interactions that CDN customers including content providers have with the CDN and interactions that content consumers or end users have with the CDN.

Each edge server of the set of edge servers 110 may represent a single physical machine or a cluster of machines that serves content on behalf of different content providers to end users. The cluster of machines may include a server farm for a geographically proximate set of physically separate machines or a set of virtual machines that execute over partitioned sets of resources of one or more physically separate machines. The set of edge servers 110 are distributed across different edge regions of the Internet to facilitate the "last mile" delivery of content. Each cluster of servers at a particular region may represent a point-of-presence (PoP) of the CDN, wherein an end user is typically routed to the closest PoP in order to download content from the CDN with the goal of reducing the time needed to deliver the content to the end user.

The traffic management servers 120 route end users, and more specifically, end user issued requests for content to the one or more edge servers. Different CDN implementations utilize different traffic management schemes to achieve such routing to the optimal edge servers. For the purposes of the discussion that is to follow, the traffic management scheme performs Anycast routing to identify a server from the set of servers 110 that can optimally serve requested content to a particular end user requesting the content. However, it should be apparent that the traffic management servers 120 can include different combinations of Domain Name System (DNS) servers, load balancers, and routers performing Anycast or Border Gateway Protocol (BGP) routing.

The administrative server 130 may include a central server of the CDN or a distributed set of interoperating servers that perform the configuration control and reporting functionality of the CDN. Content providers register with the administrative server 130 in order to access services and functionality of the CDN. Accordingly, content providers are also referred to as customers of the CDN. Once registered, content providers can interface with the administrative server 130 to specify a configuration, upload content, and view performance reports. The administrative server 130 also aggregates statistics data from each server of the set of edge servers 110 and processes the statistics to produce usage and performance reports. From these reports, the content provider can better understand the demand for its content, the performance provided by the CDN in delivering the content provider's content, and the need for capacity reallocation, among other uses.

To further aid in the discussion, the terms transit provider and peering neighbor are defined. A transit provider is a backbone carrier of content that provides routes over which the content can traverse different networks of the Internet. Telia and NTT are some examples of transit providers whose routes can be used to exchange traffic between the different networks of the Internet. The networks or endpoints of the networks may be represented by the CDN PoPs, end user machines, and smaller autonomous systems (ASes). ASes may include Internet Service Providers (ISPs) that provide Internet connectivity to sets of end users. The transit providers provide high bandwidth and low latency routes to connect the various networks, albeit at a cost. In some embodiments, transit provider routes can be avoided by "peering" with other networks such that the content traverses only between peered neighbor networks (i.e., "peering neighbors") that do not charge to carry another peered neighbor's content based upon an established level of reciprocity. An optimal route to deliver content from a PoP to an end user is one that is optimal with respect to several criteria including cost, latency, number of hops, jitter, etc.

I. End-to-End Performance Monitoring

Some embodiments implement systems and methods to monitor end-to-end CDN performance. One aspect of end-to-end performance monitoring includes monitoring the performance of Anycast routing in the CDN from the end user's perspective. Such monitoring is used to determine whether the Anycast selected PoP is the PoP that optimally serves content to the end user or whether another geographically proximate PoP optimally serves content to the end user. Such monitoring is also used to determine whether certain end users are blocked from accessing certain PoPs with Anycast routing. Another aspect of end-to-end performance monitoring includes monitoring the content delivery performance for routes of different transit providers and peering neighbors that connect a PoP to an end user. Such monitoring reveals whether content is delivered to the end user using the most efficient route connecting the end user to the PoP.

These performance monitoring systems and methods generate reports to provide a holistic view of the CDN's performance from the perspective of the end users. The monitoring results and/or reports can also be used to periodically identify optimization opportunities for improving Anycast routing performance and content delivery performance and to automatically implement the changes necessary to realize these optimizations as conditions in the CDN and across the network change. In this manner, the systems and methods automatically tune the performance of the CDN such that the resulting optimizations address performance issues that the end users experience with regards to Anycast routing and content delivery, thereby producing a direct end-to-end performance improvement in the capabilities of the CDN.

To perform the end-to-end CDN performance monitoring, some embodiments utilize a combination of software and hardware components. These components may be developed and hosted by the CDN for internal use in monitoring and optimizing its CDN service. Alternatively, these components may be developed and hosted by a third party monitoring service that monitors the performance of various CDNs and other service providers that serve content from distributed network locations. Accordingly, the software and hardware components may be located on servers that are operated independent of the servers of the CDN, but that are communicably coupled to the CDN to report the monitoring results and optimization opportunities to the CDN.

The software component includes monitoring code that is embedded into content that is requested by and executed by an end user machine. The content that is embedded with the monitoring code may be served from the edge servers of the CDN or from servers that are operated independent of the CDN. For instance, the embedded content may be served from "origin" servers that are operated by different content providers that serve a base page (i.e., base HyperText Markup Language (HTML)), but that rely on edge servers of the CDN to serve objects embedded within the base page. As another example, the embedded content may be served from servers that are operated by a monitoring service. Accordingly, the embedded content can be served from any network accessible server and the embedded content can nevertheless be used in monitoring various performance aspects of a particular CDN service, such as the below described Anycast performance monitoring and route performance monitoring.

The hardware component includes a monitoring server that aggregates the end user derived performance results from the end users executing the monitoring code. The monitoring server produces the performance reports detailing the end-to-end CDN performance as realized from the perspective of the end users. Additional analysis performed by the monitoring server may include identifying optimization opportunities for the CDN based on the aggregated monitoring results and depending on the integration of the monitoring server with the CDN, the monitoring server may leverage the aggregated monitoring results to automatically optimize performance of the CDN on a continual basis as routing and route conditions change. The monitoring server may be integrated as part of the CDN infrastructure such that it is hosted and maintained by the CDN. In some embodiments, the monitoring server is integrated with the command and control functions of the CDN administrative server. Alternatively, the monitoring server may be hosted and maintained by a third party monitoring service that monitors the performance of a CDN on behalf of the CDN. The monitoring server can then communicably couple to an administrative server of the CDN to report the monitoring results and optimization opportunities back to the CDN. Alternatively, a CDN administrator can access the monitoring server of the third party monitoring service in order to retrieve the monitoring results and optimization opportunities.

The addressing and procedures for reporting end user derived performance results to the monitoring server are included in the monitoring code. In so doing, any end user machine that downloads content that is embedded with the monitoring code becomes a monitoring agent for the CDN. As a result, the CDN can obtain a virtually unlimited number of vantage points for understanding and optimizing its performance in an automated way.

In some embodiments, the monitoring code is a set of JavaScript instructions embedded at various points in Internet based content such as HTML pages, CSS pages, XML pages, streaming content, and other such content. An end user machine receives the content using existing Internet protocol and messaging (e.g., HyperText Transfer Protocol (HTTP) GET request) and processes the content in a browser or other application running on the end user machine. During processing of the content, the end user machine will execute the monitoring code and produce various performance results related to the CDN service.

The CDN or monitoring service may designate what content is to be embedded with the monitoring code. This may include embedding the monitoring code into content of certain content providers that have permitted the CDN or monitoring service to do so. Additionally, this may include embedding the monitoring code into content that is fully controlled by the CDN. Some such content includes status or error pages served by the CDN. For example, HyperText Transfer Protocol (HTTP) 404, 403, 303 and 301 pages can be embedded with the monitoring code. Additionally, base HTML pages of different content providers can be embedded with the monitoring code.

The listing below illustrates embedding monitoring code in a HTTP 404 error page that is served by the CDN, a CDN partner, or third party monitoring service when requested content is improperly identified or does not exist:

<?xml version="1.0" encoding="iso-8859-1"?> (1)
<12OCTYPE html PUBLIC "-//W3C//DTD XHTML 1.0 Transitional//EN" (2)
"http://www.w3.org/TR/xhtml1/DTD/xhtml1-transitional.dtd"> (3)
<html xmlns="http://www.w3.org/1999/xhtml" xml:lang="en" lang="en"> (4)
<head><title>404—Not Found</title></head> (5)
<body><h1>404—Not Found</h1> (6)
<script type="text/javascript" src="http://www.google.com/jsapi"></script> (7)
<script type="text/javascript" src="http://gp1.cdn.net/ (8)
monitoringcode/beacontest.js"></script></body></html> (9)

Of particular importance are lines (7)-(9). In line (7), the instruction loads the Google Libraries Application Programming Interface (API) for location identification services, the use of which is described below. In lines (8) and (9), the instruction loads a JavaScript file that contains the instructions for executing the Anycast performance monitoring and route performance monitoring in accordance with some embodiments. The performance monitoring is performed by the end user machine as it parses the HTML content to display the 404 error. In some embodiments, the monitoring code is executed in the background by the end user machine so that the display of the user is unaffected. To do so, the monitoring code is executed within one or more hidden HTML iframes that are loaded as part of the JavaScript file in lines (8) and (9). Processes are provided with reference to the figures below to describe execution of the monitoring code to monitor Anycast routing performance and to monitor route performance.

A. Anycast Performance Monitoring

Figure 2:
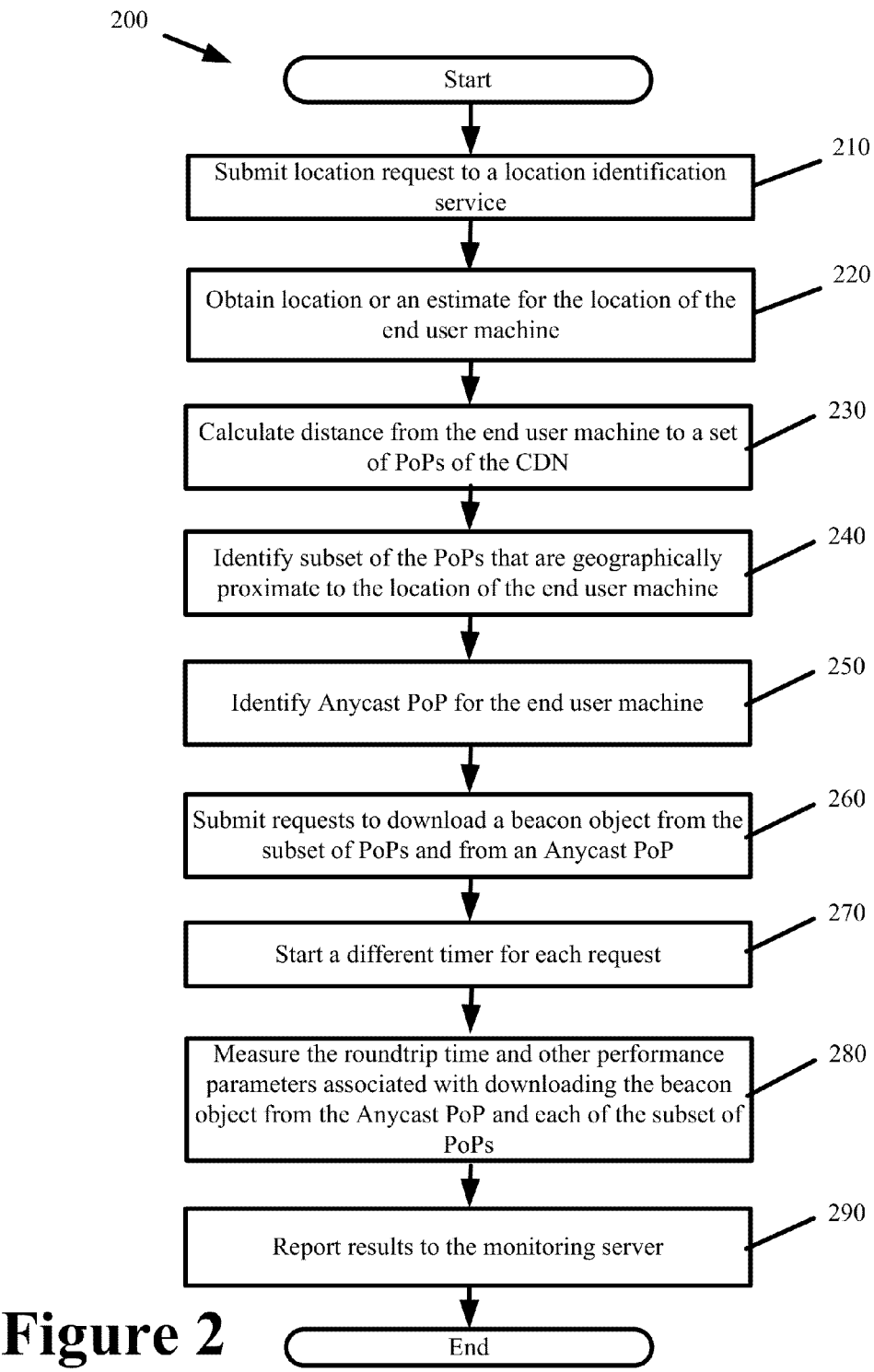
FIG. 2 presents a process for operations performed by an end user machine executing the monitoring code for Anycast performance monitoring in accordance with some embodiments.

FIG. 2 presents a process 200 for operations performed by an end user machine executing the monitoring code for Anycast performance monitoring in accordance with some embodiments. The process 200 is performed when the end user machine downloads and processes content hosted by the CDN that is embedded with the monitoring code for Anycast performance monitoring. The process 200 begins by causing the end user machine to submit (at 210) a location request to a location identification service. The location request queries the location identification service for the location of the end user machine. In some instances, the location identification service determines the location of the end user machine location based on the source IP address of the machine that is included with the location request. The location may be returned as a longitude and latitude coordinate pair. In some embodiments, the location identification service is provided by Google's Geolocation functions that are preloaded with the Google Libraries API (see the instruction at line (7) above). When the location identification services are unavailable, some embodiments roughly determine the location of the end user machine based on the time zone in which the end user machine is located. In such instances, the monitoring code fixes the latitude to a particular degree (e.g., 40 degrees as it is assumed that most end users are located in the northern hemisphere) and the longitude is then computed based on the time zone in which the end user machine operates.

The process obtains (at 220) the location or an estimate for the location of the end user machine. The process then calculates (at 230) the distance from the end user machine to a set of PoPs of the CDN. In some embodiments, the set of PoPs includes all PoPs of the CDN such that the calculation step at 230 calculates the distance from the end user machine to all PoPs of the CDN. In some embodiments, the set of PoPs includes a subset of all PoPs of the CDN that are selected for monitoring. To perform the distance calculation, the monitoring code of some embodiments is hardcoded with the location (i.e., latitude and longitude coordinates) for each PoP of the set of PoPs. However, it should be apparent that a location for each PoP of the set of PoPs can be dynamically obtained by inserting an instruction in the monitoring code that causes the end user machine to retrieve the location information from a particular server of the CDN.

Based on the distance calculation, the process identifies (at 240) a subset of the set of PoPs that are geographically proximate to the location of the end user machine. In some embodiments, identifying the subset of the PoPs includes identifying the five PoPs that are geographically closest to the location of the end user machine. Each PoP is identified in the monitoring code with an IP address. The IP address may directly address a load balancing device of a particular PoP that distributes load across the edge servers operating in that particular PoP. It should be apparent that each PoP or load balancing device may also be assigned a second IP address that is an Anycast IP address.

In some embodiments, the process also identifies (at 250) the Anycast PoP for the end user machine by submitting a request (e.g., AJAX request) to an Anycast IP address that is specified in the monitoring code and by extracting the identity of the Anycast PoP from the response header that is returned as a result of the submitted request. Identification of the Anycast PoP is performed prior to requesting and downloading the beacon object so that the process is able to distinguish between the Anycast PoP and the subset of PoPs that are geographically closest to the end user machine when downloading the beacon object at steps 260-280 below. It should be apparent to one of ordinary skill in the art that the Anycast PoP can be identified in various other ways depending on the scripting language the monitoring code is implemented in and the level of access that the end user machine provides to the process. In some embodiments, step 250 for identifying the Anycast PoP prior to downloading the beacon, object may be omitted when the process has access to the TCP/IP stack of the end user machine and can extract the source IP address that is included in the packet containing the beacon object.

The process submits (at 260) requests to download the same beacon object from each PoP of the subset of PoPs and from the Anycast PoP. It may be the case that the Anycast PoP is one of the PoPs within the subset of PoPs, however this does not impact the derived results or reporting. The beacon object is a file of negligible size (approximately 10 kilobytes) that is stored on servers of each of the PoPs. The request to download the beacon object from each PoP of the subset of PoPs is directly addressed to the unique IP address of each PoP. The request is typically in the form of an HTTP GET request. To download the beacon object from the Anycast PoP, the process submits a request for the beacon object that is addressed to an Anycast IP address of the CDN.

The process starts (at 270) a different timer for each request. The timer may be started immediately before or immediately after sending of a request. Using the timers, the process measures (at 280) the roundtrip time and other performance parameters associated with downloading the beacon object from the Anycast PoP and each of the subset of closest PoPs. In some embodiments, other performance parameters can be derived by downloading different beacon objects from the PoPs, wherein the different beacon objects may include objects with different sizes and/or content types that are downloaded from each of the subset of PoPs and the Anycast PoP. By downloading one or more of the beacon objects, the process can measure link congestion, packet loss, retransmits, latency, etc. Yet another performance parameter of importance when performing Anycast performance monitoring is determining which users are blocked from the Anycast PoP by intermediary networks connecting the end user to the Anycast PoP. This may occur, for example, when an intermediary network, country, or region has a particular policy, such as an obscenity policy, for content entering its network. As a result of the policy, the intermediary network may ban certain content that is served by the CDN. However, because the banned content and the acceptable content of the CDN may be accessed using the same Anycast address, it may be the case that the intermediary network blocks certain end users from all content of the CDN. The monitoring code identifies such blockages when the beacon object cannot be downloaded from the Anycast PoP, but can be downloaded from one or more of the geographically proximate PoPs that are directly addressed with a unique IP address instead of the Anycast address. Such monitoring is essential to the CDN to maintain service uptime and such blockages could otherwise be unknown to the CDN but for the ability to monitor Anycast performance from the end user perspective.

The process then reports (at 290) the results to the monitoring server and the process ends. The results may also include identification of the Anycast PoP and other PoPs from which the beacon object was downloaded (i.e., IP addresses, Virtual IP addresses, assigned names, etc.). The results may further identify the end user machine by including, as some examples, the end user machine IP address, location, and type of machine as part of the results that are reported to the monitoring server. In some embodiments, the monitoring server automatically identifies the location of the end user machine that reports results based on the IP address of that machine. For example, the monitoring server utilizes the Maxmind geolocation API to determine end user locations based on the IP address of the end user machine that is obtained from the source IP address field of the packet that includes the reported results. In some embodiments, the IP address and procedure for reporting the results to the monitoring server is hardcoded in the monitoring code. In some embodiments, the results are inserted as part of a URL that is passed to the monitoring server. As described below, the monitoring server produces performance reports based on the end user derived performance results and may furthermore automatically optimize Anycast routing performance based on the Anycast performance monitoring performed by the end users.

Figure 3:
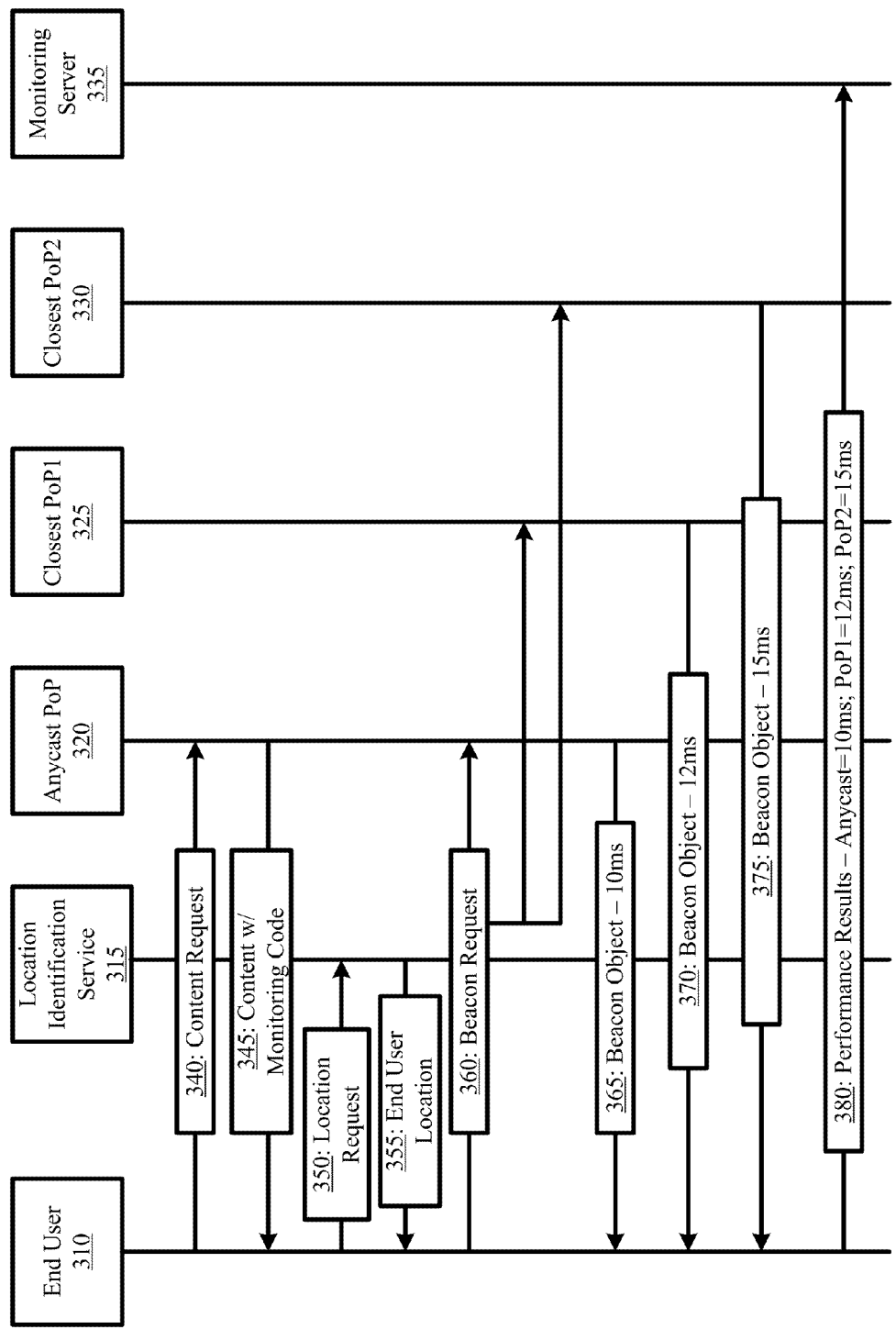
FIG. 3 conceptually illustrates a message exchange diagram to conduct performance monitoring in accordance with some embodiments.

FIG. 3 conceptually illustrates a message exchange diagram to conduct performance monitoring in accordance with some embodiments. The figure illustrates the end user 310 (i.e., end user machine), location identification service 315, Anycast PoP 320, a first geographically close PoP 325, a second geographically close PoP 330, and a monitoring server 335. The message exchange commences when the end user 310 submits (at 340) a request for content of a content provider that is served by the CDN in this figure. Anycast routing forwards the request to the Anycast PoP 320 that then replies (at 345) with the requested content that is embedded with the Anycast performance monitoring code. It should be apparent to one of ordinary skill that the content can be served by a server that is not operated by the CDN.

Upon processing the embedded monitoring code, the end user 310 submits (at 350) a location request to the location identification service 315 that then replies (at 355) to the end user 310 with the end user's location. As noted above, the monitoring code, as a failover, may also estimate the location of the end user 310 based on the time zone in which the end user 310 is located.

Though not shown in this figure, the end user 310 identifies (1) the PoP that is selected to service the end user 310 as a result of Anycast routing (i.e., the Anycast PoP) and (2) a set of PoPs that are geographically closest to the end user 310. Next, the end user 310 starts multiple timers in conjunction with issuing requests (at 360) for the same beacon object from the Anycast PoP 320 and the two PoPs 325 and 330 that are geographically closest to the end user 310. The end user 310 measures (at 365) the roundtrip time to download the beacon object from the Anycast PoP 320, measures (at 370) the roundtrip time to download the beacon object from the first closest PoP 325, and measures (at 375) the roundtrip time to download the beacon object from the second closest PoP 330. The performance results (i.e., roundtrip times measured at steps 365, 370, and 375) as well as various identification information are then reported (at 380) to the monitoring server 335 for analysis and CDN optimization as described in Section II below. The identification information includes identifying the PoP from which a particular measurement is derived, identifying the end user 310, and optionally identifying a location of the end user 310.

The monitoring code described above monitors Anycast performance from an end user's perspective and is useful in determining whether the end user is being routed to the optimal PoP from which to receive content and in determining if certain end users are blocked from accessing an Anycast address of the CDN. In some embodiments, the monitoring server aggregates the monitoring results reported by a group of end users and the monitoring server organizes the results based on the location of the end users to generate reports that present a holistic view of the Anycast routing performance from the perspective of the end users. The reports can also be used to identify optimization opportunities for improving Anycast routing performance, which the monitoring server can automatically implement in some embodiments. These optimizations can then ensure that an end user is routed to the optimal PoP even when the optimal PoP is different than the one that would otherwise be selected as a result of Anycast routing. For example, the optimizations can resolve issues for end users that are blocked from accessing the CDN Anycast address.

Figure 4:
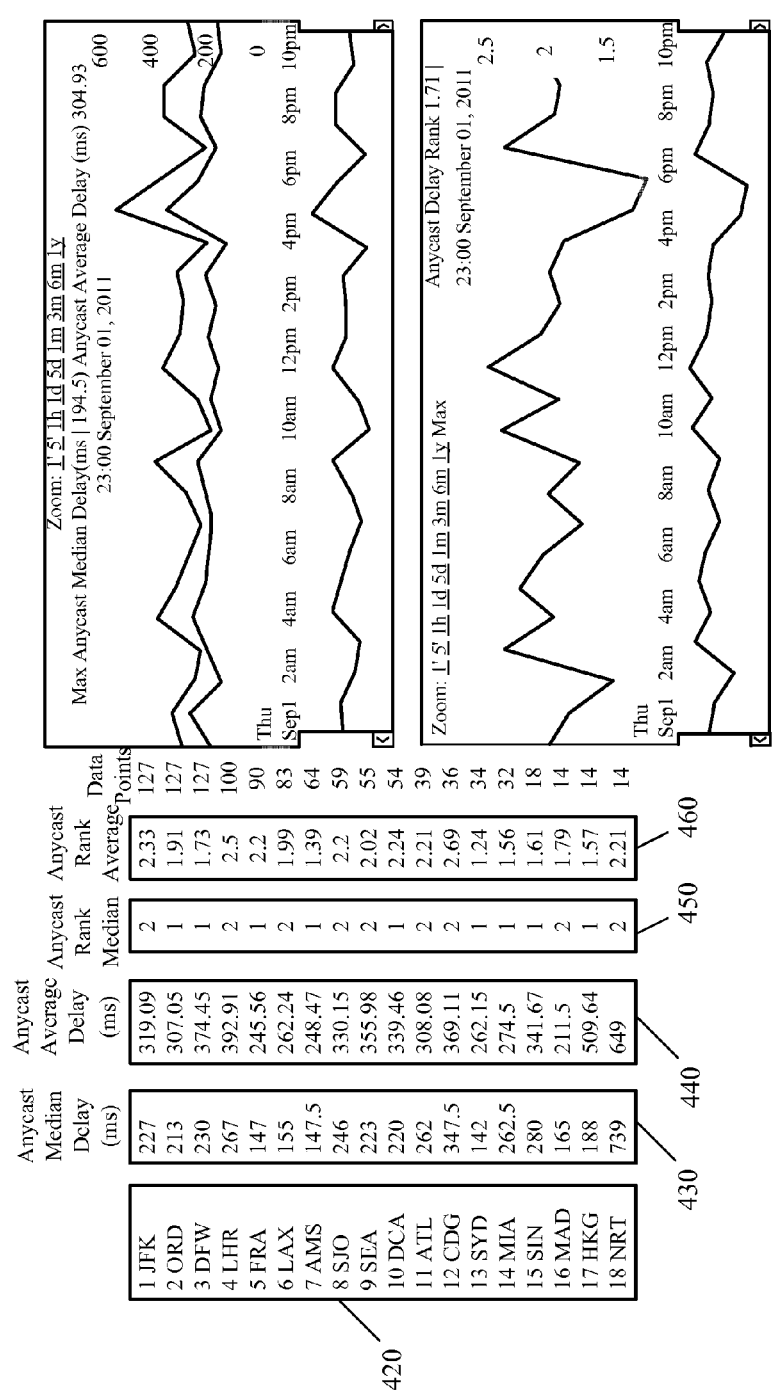

FIGS. 4-5 illustrate some of the reports that are generated by the monitoring server in accordance with some embodiments based on end user derived Anycast performance monitoring results. FIG. 4 illustrates a monitoring interval 410, a list of CDN PoPs 420, and various performance metrics 430, 440, 450, and 460 that are produced from the aggregated end user derived performance monitoring results.

The monitoring interval 410 limits the Anycast performance monitoring to include performance results derived by end users during the specified interval. By continually updating the interval to include the latest set of aggregated results, the monitoring server or a CDN administrator can obtain temporally relevant information from which the CDN service can be optimized.

In this figure, column 430 presents the median delay that end users experienced when downloading the beacon object from their Anycast selected PoP. Column 440 presents the average delay that end users experienced when downloading the beacon object from their Anycast selected PoP. Columns 450 and 460 present the median and average rankings for identifying whether a PoP was indeed the optimal PoP for the end users that were routed to that PoP as a result of Anycast routing. To compute the average and median rankings for a particular PoP, the monitoring server first computes a ranking for each end user that was routed to the particular PoP as a result of Anycast routing. A ranking of 1 indicates that the end user was able to download the beacon object from the Anycast PoP faster (i.e., less delay) than from other PoPs. A ranking of 2 indicates that the end user was able to download the beacon object from one PoP faster than from the Anycast PoP. Then for the end users of a particular Anycast PoP, the monitoring server determines the median and average rankings.

FIG. 5 illustrates a report for presenting Anycast performance per autonomous system (AS). This report includes column 510 for identifying different ASes, column 520 for identifying the median Anycast delay experienced by each AS, column 530 for identifying the average Anycast delay experienced by each AS for content delivered to the AS from an Anycast selected PoP of the CDN, and column 540 for identifying an average ranking for the Anycast PoP that was selected for each AS. The data points obtained for each AS or autonomous system are representative of the unique end users that gain access to the CDN through that AS. An AS can include an Internet Service Provider (ISP), an organization, or any other entity or service from which a group of end users can access the CDN. For a particular AS, the median Anycast delay value in column 520 identifies the median delay that end users of that particular AS experience when downloading the beacon object from a PoP of the CDN that Anycast routing selects for those end users. For a particular AS, the average Anycast delay value in column 530 identifies the average delay that end users of that particular AS experience when downloading the beacon object from a PoP of the CDN that Anycast routing selects for those end users. Column 540 identifies the average ranking for the PoP that is selected by Anycast routing to serve content to a particular AS. The average ranking is derived based on the average ranking that each end user of a particular AS identifies for an Anycast PoP. Other performance metrics are also included within the report, but the description of which is omitted for reasons of simplicity.

Other reporting and uses of the Anycast performance monitoring results include identifying which end users are blocked from accessing content that is addressed using the CDN Anycast address, identifying which end users are routed to which PoPs, which ASes reach which PoPs, which country, states, or geographic regions reach which PoPs, which prefix addresses reach which PoPs, what are the "hot ASes" that provide a majority of traffic to the CDN, what is the beacon object download latency from the end user's perspective, and the overall effectiveness of Anycast routing compared to other routing schemes.

B. Route Monitoring

To provide comprehensive end-to-end monitoring, some embodiments further provide an independent or complimentary set of monitoring code to monitor performance of the transit provider routes and peering neighboring routes through which content can be served from a PoP to the end user. For reasons of performance and redundancy, CDNs often connect their PoPs to other networks or ASes via multiple routes that are operated by different transit providers or neighboring networks that the CDN has an established peering relationship with. Through each of these routes, the PoP is able to exchange traffic with the ASes in order to ultimately reach the end user. However, each of the routes may provide different levels of performance as a result of experiencing different levels of congestion, load, delay, etc. Moreover, each of the routes may be subject to different costs considerations. Collectively, these different levels of performance and cost consideration determine which route of the set of routes connecting a PoP to an end user is optimal. Therefore, by measuring route performance and accounting for cost considerations, the CDN can optimize its content delivery service to provide the best possible end user experience. Then together with the Anycast performance monitoring, the CDN can fully optimize its service so that the end user is routed to the most optimal PoP and the end user receives content from that PoP through the most optimal route.

Figure 6:
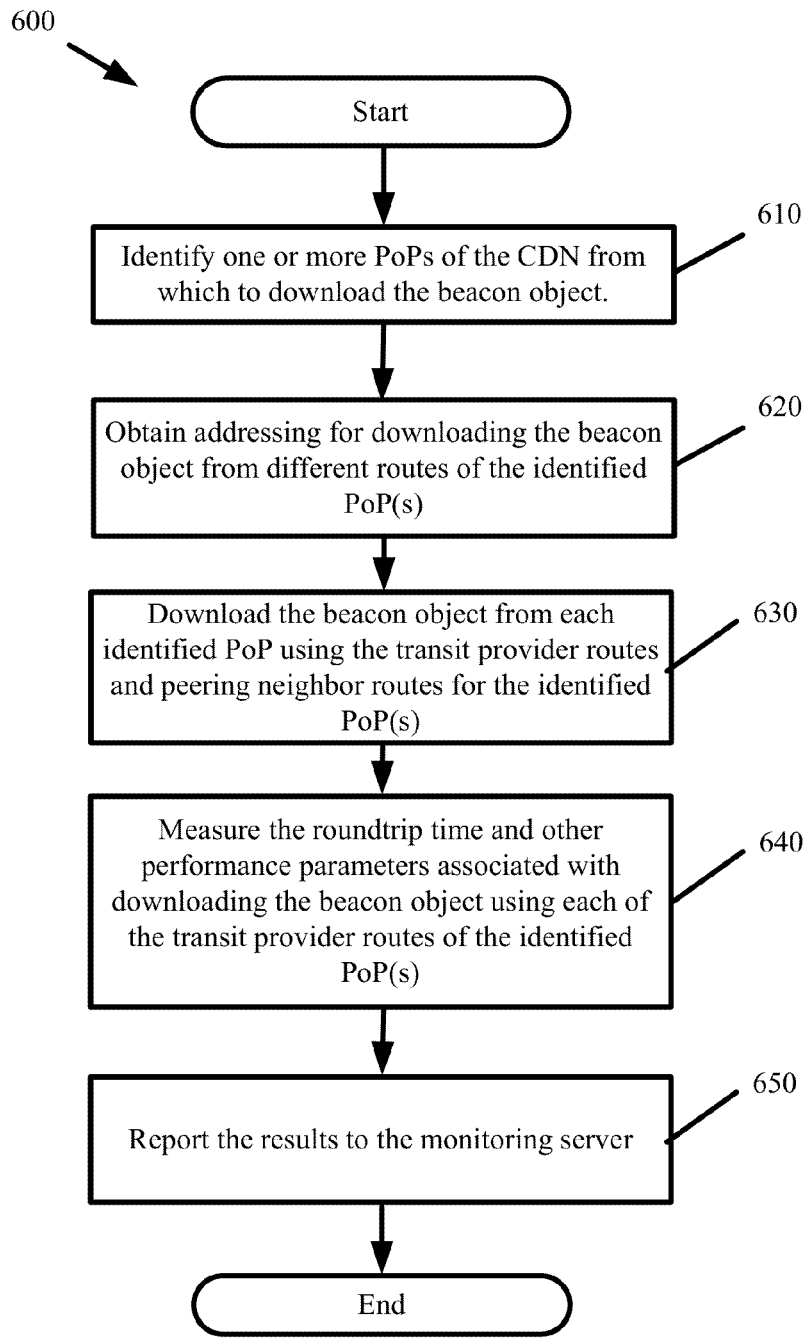
FIG. 6 presents a process for operations performed by an end user machine executing the monitoring code for route performance monitoring in accordance with some embodiments.

The monitoring code for route performance monitoring may be embedded in various content served by the CDN, CDN partners, or third party monitoring service. This may include embedding the monitoring code into content of certain content providers that have permitted the CDN or monitoring service to do so. Additionally, this may include embedding the monitoring code into content that is fully controlled by the CDN. Some such content includes status or error pages served by the CDN. For example, HyperText Transfer Protocol (HTTP) 404, 403, 303 and 301 pages can be embedded with the monitoring code. Additionally, base HTML pages of different content providers can be embedded with the monitoring code FIG. 6 presents a process 600 for operations performed by an end user machine executing the monitoring code for route performance monitoring in accordance with some embodiments. The process begins by identifying (at 610) one or more PoPs of the CDN from which to download the beacon object. In some embodiments, the PoP identified at step 610 is the Anycast PoP. In some other embodiments, the PoPs identified at step 610 include the Anycast PoP and a subset of PoPs that are geographically closest to the end user, which may be identified by executing instructions similar to those at step 240 of the process 200.

Next, the process obtains (at 620) addressing for downloading the beacon object from different routes of the identified PoP(s). In some embodiments, the addressing for the routes to and from each PoP are hardcoded in the monitoring code. A route of a peering neighbor, should one exist from a particular PoP to an end user, can be identified with an Anycast IP address. In such instances, when a request for the beacon object is received at the particular PoP with the Anycast IP address, the particular PoP will submit the beacon object over a default route which would be the route of the peering neighbor, if one exists, as that route should be the most direct and least cost route from the particular PoP to the end user. Each transit provider route from the particular PoP to the end user is assigned a different IP address and each IP address is associated with a routing policy that is configured at the core router of the particular PoP. Based on the IP address and routing policy, the core router determines what transit provider route to use to pass packets between the particular PoP (i.e., a server of the PoP) and the end user machine. For example, when a request for the beacon object is sent to the IP addresses 1.1.1.1 and 1.1.1.2, it may be that the request is routed to the same PoP, but when the beacon object is sent to the requesting end user, the address 1.1.1.1 causes the core router of the PoP to serve the beacon object using a first transit provider route and the address 1.1.1.2 causes the core router of the PoP to serve the beacon object using a second transit provider route.

The process downloads (at 630) the beacon object from each identified PoP using all of the transit provider routes and zero or more peering neighbor routes available at each identified PoP. This includes starting different timers in conjunction with submitting multiple requests to the identified PoP, wherein the requests include (1) the IP addresses assigned to the different transit provider routes for the identified PoP and (2) the Anycast IP address that causes the identified PoP to pass the beacon object through a default route that may include a route of a peering neighbor if one exists. The process (at 640) measures the roundtrip time and other performance parameters associated with downloading the beacon object using each of the routes from each of the identified PoP(s). The process (at 650) reports the results to the monitoring server for analysis, report generation, and CDN optimization and the process ends. The results reported to the monitoring server may also include identification of the end user machine including as some examples the end user machine IP address, location, and type of machine.

In addition to identifying the performance of the different routes from a PoP to an end user, the route performance monitoring may further reveal that certain ASes or intermediary networks in between the sending PoP and the receiving end user block the passage of the beacon object when the beacon object is contained in a packet addressed using the Anycast address. Specifically, the monitoring server can identify such blockages when the end user does not receive the beacon object over a default route that is addressed with the Anycast address, but does receive the beacon object over a transit provider route that is address with a unique IP address.

Figure 7:
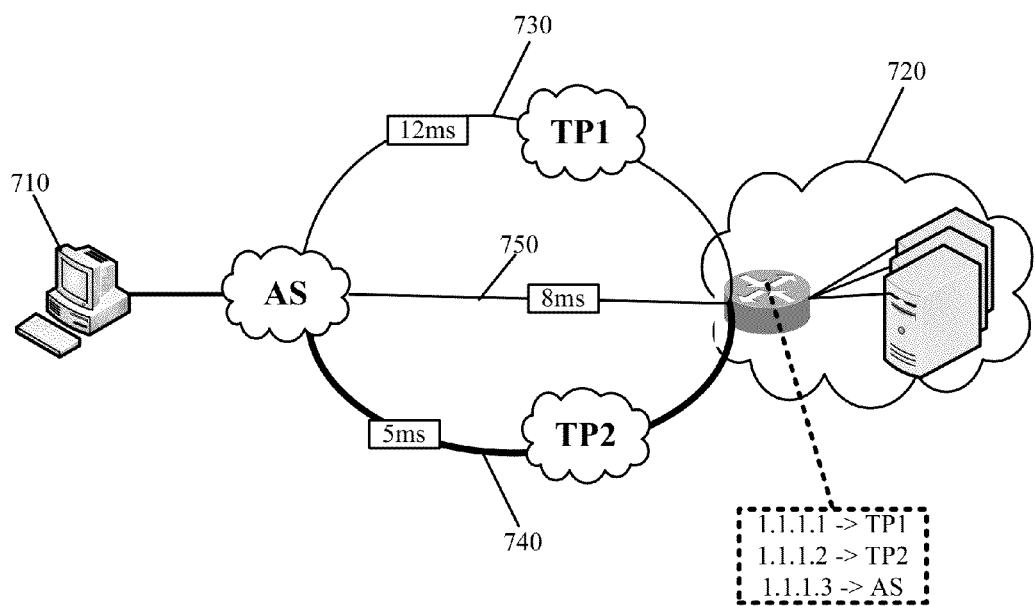
FIG. 7 conceptually illustrates performing route performance monitoring in accordance with some embodiments.

FIG. 7 conceptually illustrates performing route performance monitoring in accordance with some embodiments. The figure illustrates end user machine 710, PoP 720, and routes 730, 740, and 750 that connect the PoP 720 to the end user machine 710. Route 730 is operated by a first transit provider, route 740 is operated by a second transit provider, and route 750 is operated by a peering neighbor that is illustrated in this figure as an AS that the end user 710 uses to access the Internet (i.e., ISP). It should be apparent that various other ASes or other networks that are not shown may also be involved in delivering the content from the PoP 720 to the end user 710 or may provide a part of the route connecting the PoP 720 to the end user 710.

As noted above, the monitoring code causes the end user machine 710 to download the beacon object from the PoP 720 using each of the routes 730, 740, and 750 by requesting the beacon object using the different IP addresses assigned to each of the routes (e.g., 1.1.1.1 for the route of TP1, 1.1.1.2 for the route of TP2, and 1.1.1.3 for the route of peering neighbor). The monitoring code also causes the end user machine 710 to measure the time required to download the beacon object using each of the routes 730, 740, and 750. Since each route is of different lengths, has a different number of hops, suffers different amounts of congestion, etc., the resulting measurements reveal which route is the optimal route for serving content from the PoP 720 to the end user 710. Also, the resulting measurements reveal which route blocks content from the CDN to the end user. These performance results can then be used by the monitoring server to optimize CDN service as described below.

The monitoring code described above monitors route performance from an end user's perspective and is useful in determining whether the PoP is serving content to the end user using the optimal available route. The monitoring server receiving the end users' route performance monitoring results generates reports that present a holistic view for the routes from the perspective of the end users. The reports can also be used to identify optimization opportunities for improving CDN performance by ensuring that the most optimal route is selected for the end users.

Figure 8:
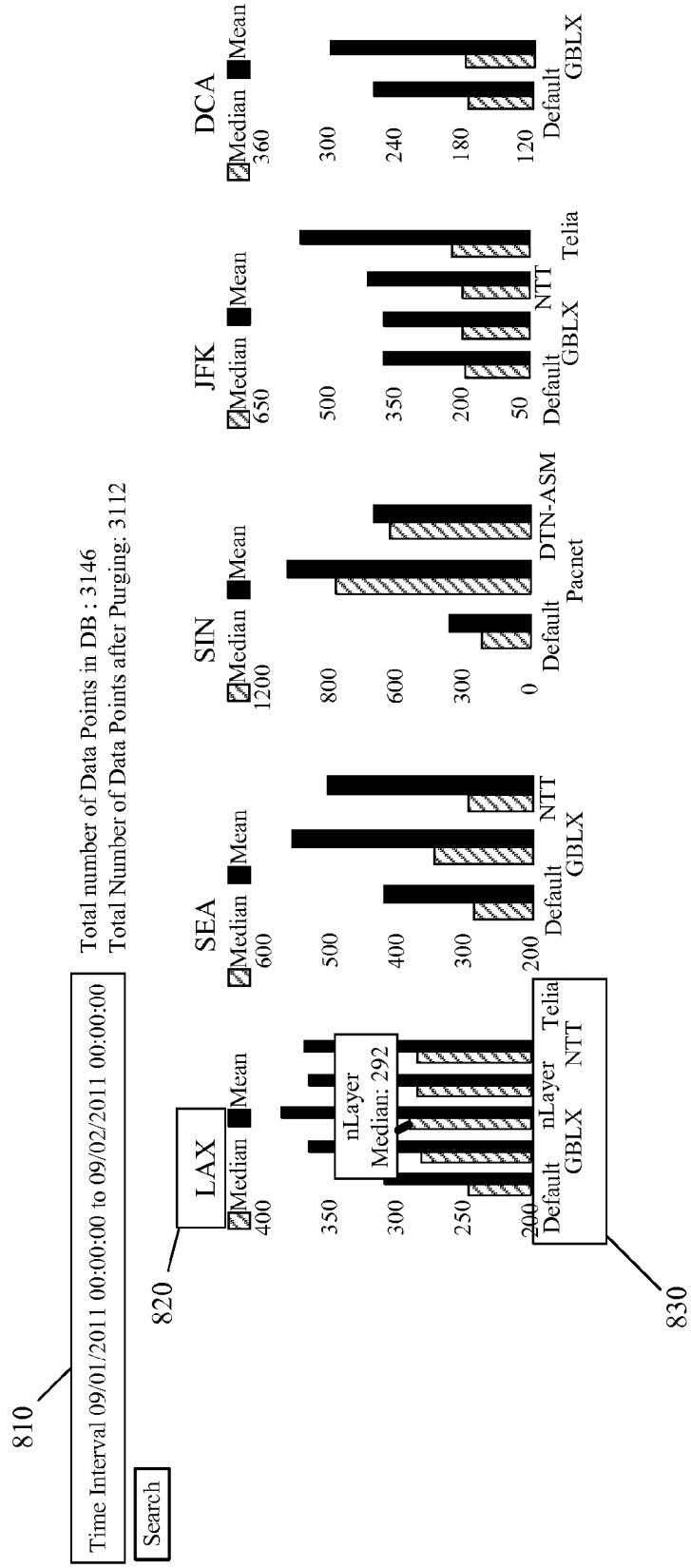

FIGS. 8-9 illustrate some of the reports that are generated by the monitoring server in accordance with some embodiments based on end user route performance monitoring results. FIG. 8 illustrates a monitoring interval 810, a set of PoPs of the CDN as represented by reference marker 820 for a specific PoP, and a set of routes for each of the PoPs as represented by reference marker 830 for the set of routes for PoP 820.

As shown for PoP 820, the results of end user monitoring are used to derive median and mean delays for a default route, a route provided by the transit provider Global Crossing (GBLX), a route provided by the transit provide nLayer, a route provided by the transit provider NTT, and a route provided by the transit provider Telia. The default route may be used to respond to requests that are addressed to an Anycast address, whereas each of the transit provider routes may be used to respond to requests that are addressed to specific IP addresses assigned to each of the transit provider routes. In this figure, the default route is a route provided by a peering neighbor.

Based on the derived results, the CDN is able to determine that the default route (the route of the peering neighbor) from PoP 820 is the optimal route because it suffers the least amount of delay when passing content from the PoP 820 to the end users. This may occur since the route of the peering neighbor can be a more direct route from the PoP 820 to the end user when the peering neighbor is a local telco that the end user uses as its ISP to connect to the Internet. In the event that the default route is not the optimal route for a particular PoP, a CDN administrator can utilize the results to identify an optimization opportunity that can be realized by switching to a more optimal transit provider route for content that is served from that particular PoP. In some embodiments, the results of FIG. 8 are considered in conjunction with route costs to determine the optimal route.

FIG. 9 presents an alternate set of end user monitoring reports that are derived by the monitoring server based on end user route performance monitoring results. The reports of FIG. 9 present performance results on a per AS basis as opposed to the per PoP basis presented in the reports of FIG. 8. As shown, the figure presents a list of ASes 910 and performance results for each of a default route 920 and routes of different transit providers 930, 940, 950, and 960 for each of the ASes. The delay value for the route of the transit provider that is optimal for each AS is presented in parenthesis. In most instances, the delay of the default route is optimal. This may be a consequence of the default route representing a route of a peering neighboring which better directly connects the PoP to the AS (e.g., fewer hops, greater bandwidth, etc.) These results may be utilized in conjunction with or independent of the results of FIG. 9 to identify additional optimization opportunities for the CDN.

II. CDN Performance Optimization

In some embodiments, the monitoring server aggregates the performance results derived by each of the end users and leverages the results to optimize performance of the CDN on a continual basis as routing and route conditions change. From this information, the monitoring server can then automatically optimize Anycast routing for the CDN. Some optimizations that may be made include ensuring that certain users are routed to an optimal PoP even when the optimal PoP for those users is not the Anycast PoP and distributing loads from a "hot AS" across multiple PoPs rather than allow a single Anycast PoP for that AS from becoming overloaded. Another optimization includes providing alternative routing for certain end users that are unable to obtain CDN content using Anycast routing or an Anycast address. It should be apparent that other optimizations can be made based on the end user derived performance results and that the optimizations enumerated herein are not intended to be limiting in any way.

Figure 10:
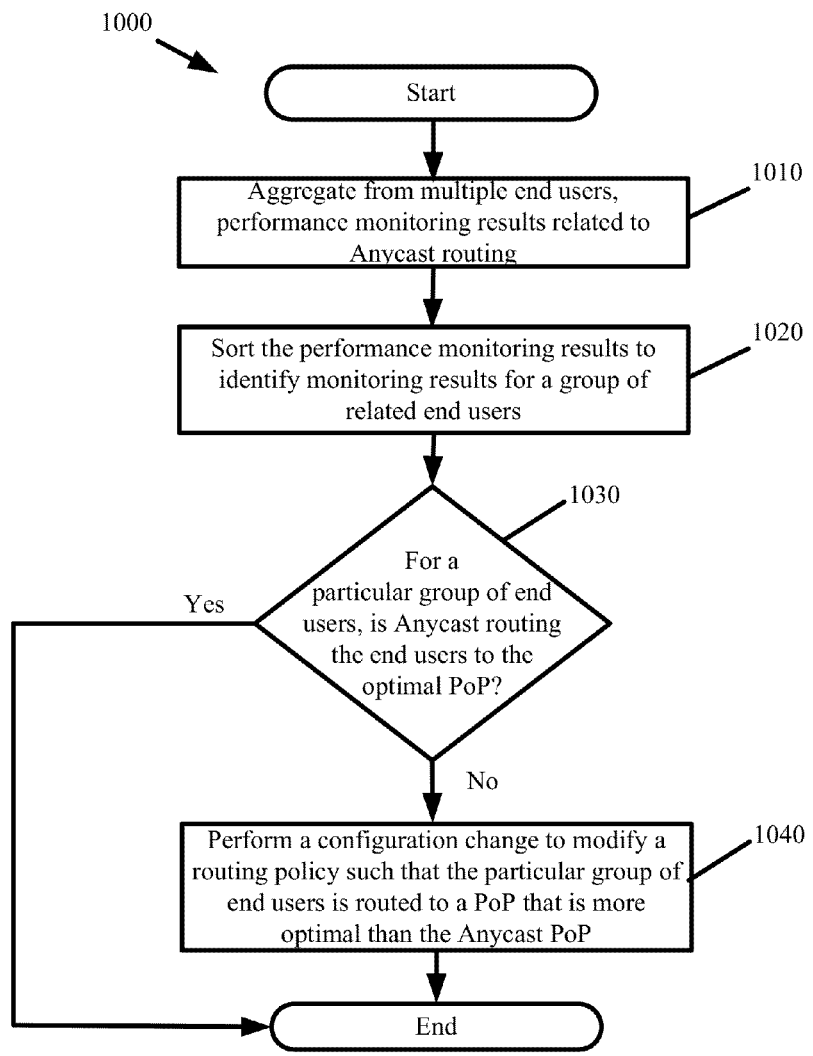
FIG. 10 presents an Anycast optimization process performed by the monitoring server in accordance with some embodiments.

FIG. 10 presents an Anycast optimization process 1000 performed by the monitoring server in accordance with some embodiments. The process 1000 begins by the monitoring server aggregating (at 1010) from multiple end users, performance monitoring results relating to Anycast routing. In some embodiments, the monitoring server continually performs the aggregation of the performance monitoring results as end users report the results to the monitoring server. For this process, it is assumed that the performance monitoring results related to Anycast routing include the beacon object download times from an Anycast PoP and a set of geographically proximate PoPs as described above with reference to FIG. 2.

Once a sufficient set of performance monitoring results have been aggregated, the process sorts (at 1020) the performance monitoring results to identify monitoring results for a group of related end users. The group of related end users may include end users of the same AS, end users having the same IP address prefix, end users that are located at the same geographic region, or end users that are served by the same Anycast PoP as some examples. The sorting step may be performed on a periodic basis. For example, the sorting may be conducted daily based on performance monitoring results that have been aggregated over the past twenty four hours.

Next, the process compares the performance results for a particular group of end users to determine (at 1030) if Anycast routing is routing the particular group of end users to the optimal PoP, wherein the optimal PoP for the purposes of this example is the PoP that is reachable by the particular group of end users with the least amount of delay. This determination can be made by comparing the beacon object download time for an Anycast PoP with the beacon object download times for other PoPs that are geographically proximate to the particular group of end users. When the Anycast PoP is identified to be less optimal than another PoP, the process performs (at 1040) a configuration change to modify a routing policy of the CDN such that the particular group of end users is no longer routed to the Anycast PoP, but to the more optimal PoP. In some embodiments, the configuration change involves modifying routing policies at the border routers of a particular AS or the border routers to which the particular group of end users arrive before being routed to a CDN PoP. In some embodiments, the configuration change can be performed using border gateway protocol (BGP) route injection or by notifying intermediate ASes from which the particular group of end users arrive of a best path that deviates from the Anycast selected path. In some embodiments, the configuration change can be performed by altering BGP parameters such as Multi_Exit_Disc (Meds), local preferences, weights, etc. or by prepending or appending values to BGP paths to impact Anycast routing. These configuration changes can also be performed to resolve blockages experienced by certain end users that are otherwise unable to access content from the CDN via Anycast routing or the CDN Anycast address. Otherwise, the particular group of end users is being optimally routed by Anycast and no further optimizations are made at this stage and the process ends.

The above optimizations apply to Anycast routing to ensure that the end users are being routed to the optimal PoP even in scenarios where the Anycast selected PoP is less optimal than other available PoPs or the Anycast PoP is blocked. To complete the end-to-end CDN optimizations, the monitoring system further leverages the performance monitoring results to configure selection of the optimal route to deliver content from the optimally selected PoP to the end users where the optimal route can be provided by any one of several transit provider routes or routes of one or more peering neighbors that connect the optimal CDN PoP to a set of end users.

Figure 11:
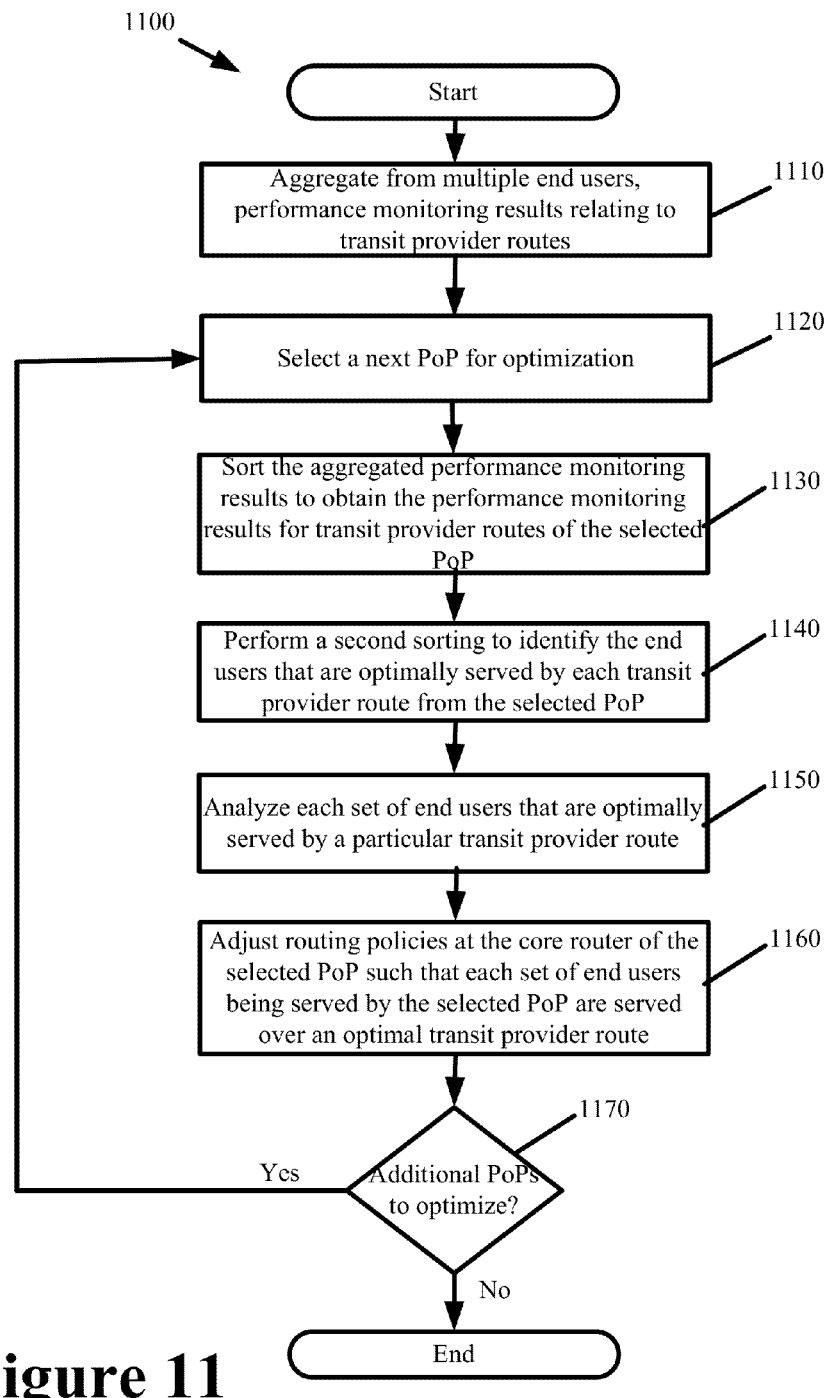
FIG. 11 presents a route optimization process performed by the monitoring server in accordance with some embodiments.

FIG. 11 presents a route optimization process 1100 performed by the monitoring server in accordance with some embodiments. The process 1100 begins by the monitoring server aggregating (at 1110) from multiple end users, results relating to the performance of different routes from a PoP to one or more end users. For this process, it is assumed that the performance results related to the routes include the beacon object download times that an end user derives when downloading the beacon object from the same PoP over multiple different routes as described above with reference to FIG. 6.

The process selects (at 1120) a next PoP for optimization. The process sorts (at 1130) the aggregated performance results for the selected PoP. Next, the process performs (at 1140) a second sorting to identify the end users that are optimally served by each route from the selected PoP. The process analyzes (at 1150) each set of end users that are optimally served by a particular route. Based on the analysis, the process adjusts (at 1160) routing policies at the core router of the selected PoP such that each set of end users being served by the selected PoP are served by an optimal route. For example, a first set of end users coming from a first AS to a particular PoP may be optimally served using a route of a first transit provider while a second set of end users coming from a second AS to the particular PoP may be optimally served using a route of a second transit provider. In some embodiments, the process adjusts the routing policies at the core router by inserting static routes, BGP route injection, or by making changes to BGP parameters such as AS based routing, weights, and other parameters available in commercial routers to force certain prefixes or AS paths to prefer certain transit or peering connections. These adjustments can also resolve blockages that are experienced by certain end users. For example, a particular PoP may utilize a default route that is established with a peering neighboring to serve content to a set of end users that have the same IP address prefix. However, the peering neighbor may block content that is served from the particular PoP to that IP address prefix using the peered route. Accordingly, the process can adjust the routing policy at the core router of the particular PoP such that a different route provided by a transit provider is used to deliver content to the set of end users, where the transit provider route avoids the peering neighbor that blocks the CDN content from being served.

The process then continues (at 1170) to step 1120 for the next PoP until all PoPs have been optimized at which the process ends. The process can be performed periodically to adjust to changing route conditions, thereby ensuring that the optimal route does not become stale over time. It should be apparent to one of ordinarily skill in the art that the optimization process 1100 of FIG. 11 can be made more or less granular such that optimizations are performed on a per AS basis, per IP address prefix basis, or per end user basis.

Figure 12:
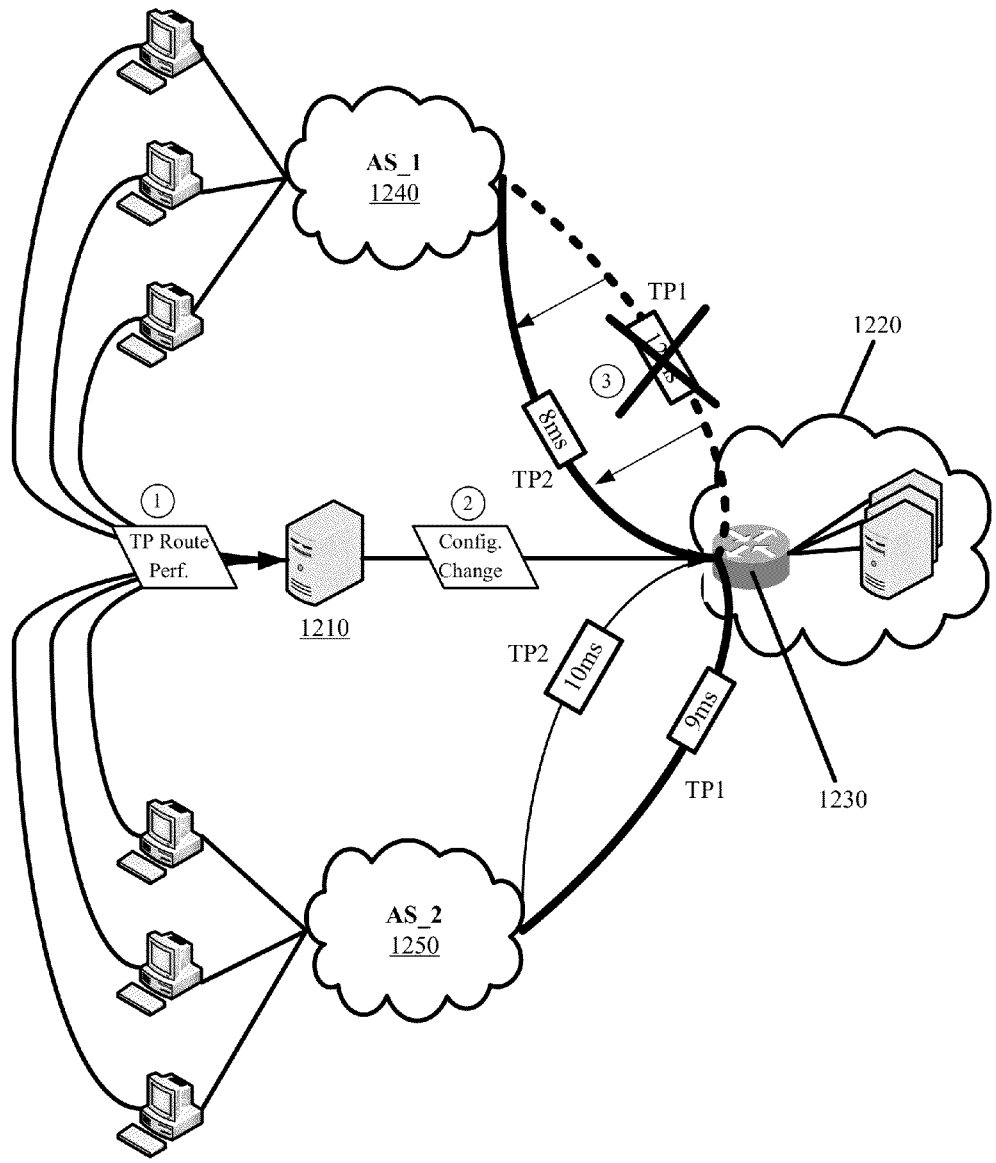
FIG. 12 conceptually illustrates route optimization performed by the monitoring server in accordance with some embodiments.

FIG. 12 conceptually illustrates route optimization performed by the monitoring server in accordance with some embodiments. The figure illustrates monitoring server 1210, PoP 1220 with a core router 1230, a first transit provider with routes that connect the PoP 1220 to each of a first AS 1240 and a second AS 1250, and a second transit provider with routes that connect the PoP 1220 to each of the first AS 1240 and the second AS 1250. Initially, the routes of the first transit provider are used as the default routes for delivering content from the PoP 1220 to each of the ASes 1240 and 1250.

Over time, the monitoring server 1210 aggregates route performance monitoring results from the end users of the ASes 1240 and 1250. From the aggregated results, the monitoring server 1210 determines that the route of the second transit provider is more optimal than the route of the first transit provider for delivering content from the PoP 1220 to the first AS 1240 or to the end users that arrive from the first AS 1240. Therefore, the monitoring server 1210 automatically issues a configuration change to the core router 1230 of the PoP 1220 to optimize content delivery for the end users of the first AS 1240. Specifically, the configuration change overwrites a routing policy at the core router 1230 such that the route of the second transit provider is used for delivering content to the end users of the first AS 1240 instead of the default route of the first transit provider. From the aggregated results, the monitoring server 1210 also determines that the default route from the PoP 1220 to the second AS 1250 is the optimal route and no further optimization need be made.

The monitoring and optimizations are repeated at regular intervals to account for changes in the routes. For example, after six hours it may be the case that the route of the first transit provider once again is optimal with respect to the route of the second transit provider for serving content to the end users of the first AS 1240. Consequently, the monitoring server 1210 may issue a second configuration change to the core router 1230 of the PoP 1220 to revert back to the route of the transit provider when delivery content to the end users of the first AS 1240.

III. Server System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine is meant in its broadest sense, and can include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Furthermore, almost everywhere that a server is identified as a component of the embodied invention, it is understood that the server may be a single physical machine, or a cluster of multiple physical machines performing related functions, or virtualized servers co-resident on a single physical machine, or various combinations of the above.

Figure 13:
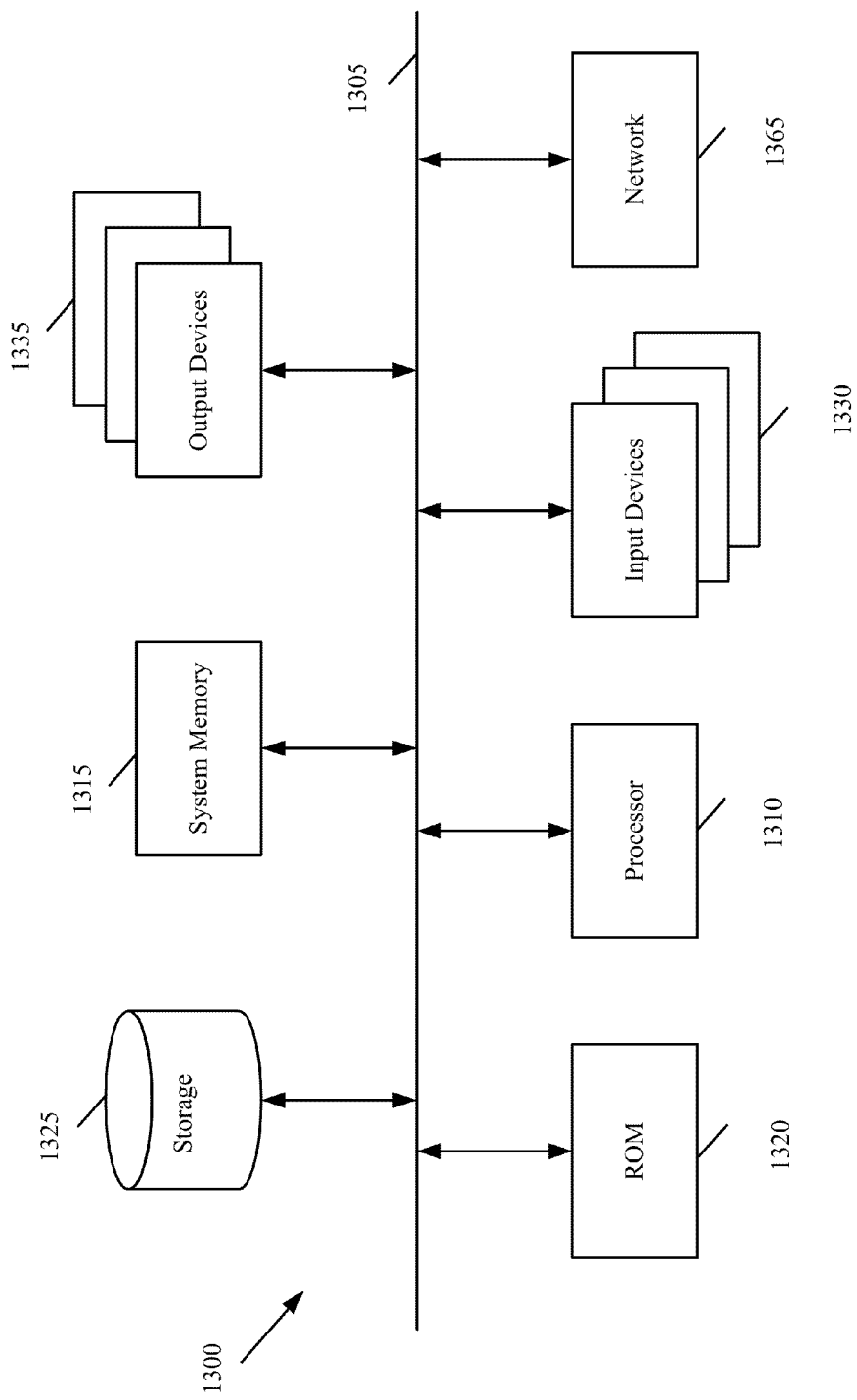
FIG. 13 illustrates a computer system or server with which some embodiments are implemented.

FIG. 13 illustrates a computer system or server with which some embodiments are implemented. Such a computer system includes various types of computer readable mediums and interfaces for various other types of computer readable mediums that implement the various frameworks described above (e.g., monitoring server, edge servers, etc.). Computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325. From these various memory units, the processor 1310 retrieves instructions to execute and data to process in order to execute the processes of the invention. The processor 1310 is a processing device such as a central processing unit, integrated circuit, graphical processing unit, etc.

The read-only-memory (ROM) 1320 stores static data and instructions that are needed by the processor 1310 and other modules of the computer system. The permanent storage device 1325, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1325.

Other embodiments use a removable storage device (such as a flash drive) as the permanent storage device. Like the permanent storage device 1325, the system memory 1315 is a read-and-write memory device. However, unlike storage device 1325, the system memory is a volatile read-and-write memory, such a random access memory (RAM). The system memory stores some of the instructions and data that the processor needs at runtime. In some embodiments, the processes are stored in the system memory 1315, the permanent storage device 1325, and/or the read-only memory 1320.

The bus 1305 also connects to the input and output devices 1330 and 1335. The input devices enable the user to communicate information and select commands to the computer system. The input devices 1330 include alphanumeric keypads (including physical keyboards and touchscreen keyboards), pointing devices (also called "cursor control devices"). The input devices 1330 also include audio input devices (e.g., microphones, MIDI musical instruments, etc.). The output devices 1335 display images generated by the computer system. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet, or a network of networks, such as the internet. For example, the computer 1300 may be communicably coupled through the network 1365 to an ingest server, mid-tier server, edge server, content provider streaming server, or end user device.

As mentioned above, the computer system 1300 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for monitoring route performance of a particular point-of-presence (PoP) of a content delivery network (CDN), said method comprising:

providing content that is embedded with monitoring code from the particular PoP to an end user machine using as a default route, a first route from a set of routes, wherein each route of the set of routes comprises a different set of network hops that is traversed in reaching the end user machine and the first route comprises a first set of network hops, and wherein the monitoring code comprises sets of instructions which when executed by the end user machine cause the end user machine to (i) identify the set of routes from which content can be served from the particular PoP to the end user machine, (ii) measure performance for downloading a particular object from the particular PoP using each route of the set of routes, and (iii) report said performance measurements to a monitoring server;

serving a different instance of the particular object from the particular PoP to the end user machine through different sets of network hops corresponding to each route of the set of routes;

receiving at the monitoring server, performance measurements produced by the end user machine executing said monitoring code; and configuring the particular PoP with a particular second route from the set of routes that is not the first route as the default route for use in serving content from the particular PoP to the end user machine when the particular route is determined to be optimal relative to the first route based on said performance measurements, wherein the particular route comprises a second set of network hops that differ from the first set of network hops of the first route.

2. The method of claim 1, wherein the set of routes further comprises at least one peering route that is established with a neighboring autonomous system (AS) for connecting in part the end user machine to the particular PoP.

3. The method of claim 2, wherein the first route is the peering route.

4. The method of claim 1 further comprising generating a report to identify instances when the first route does not result in an end user optimally receiving content from the particular PoP.

5. The method of claim 1 further comprising configuring the particular second route from the set of routes based on (i) cost of the particular route relative to cost of the first route and (ii) reported performance measurements from the end user machine.

6. The method of claim 1 further comprising repeating said configuring on a periodic interval based on performance measurements reported by end user machines during each periodic interval.

7. The method of claim 1, wherein the monitoring code further comprises a set of instructions for identifying the particular PoP using Anycast routing.

8. The method of claim 1, wherein the monitoring code further comprises a plurality of IP addresses for addressing a request for the particular object to the particular PoP, wherein each IP address causes the particular PoP to serve the particular object using a different route of the set of routes.

9. The method of claim 1 further comprising associating a different IP address to each route of the set of routes from which content can be served from the particular PoP to the end user machine.

10. The method of claim 1, wherein said configuring comprises modifying a configuration of a router at the particular PoP.

11. The method of claim 1 further comprising analyzing performance measurements reported by at least the end user machine of a set of end user machines associated with a particular AS, and wherein configuring the particular second route comprises selecting a route from the set of routes that is not the first route for use in serving content from the particular PoP to end users associated with the particular AS.

12. The method of claim 1 further comprising analyzing performance measurements reported by at least the end user machine of a set of end user machines that are located in a particular geographic region, and wherein configuring the particular second route comprises selecting a route from the set of routes that is not the first route for use in serving content from the particular PoP to end users located in the particular geographic region.

13. The method of claim 1 further comprising analyzing performance measurements reported by at least the end user machine of a set of end user machines having a particular IP address prefix, and wherein configuring the particular second route comprises selecting a particular route from the set of routes that is not the first route for use in serving content from the particular PoP to end users having the particular IP address prefix.

14. The method of claim 1, wherein providing the monitoring code embedded in said content comprises encoding said monitoring code as a set of JavaScript instructions that are embedded in an error page that is served to the end user machine when the end user machine submits an invalid request for content.

15. A method for monitoring route performance of a particular PoP of a CDN, said method comprising:
  at an end user machine, receiving content that is embedded with monitoring code comprising sets of instructions for performing said route performance monitoring;
  based on a set of instructions of the monitoring code, identifying addressing for downloading a particular object from the particular PoP using a default route and each route of a set of routes that are available for connecting in part the end user machine to the particular PoP, wherein the set of routes comprises routes of different transit providers and each route of the set of routes comprises a different set of network hops that are traversed in connecting in part the end user machine to the particular PoP;
  based on a set of instructions of the monitoring code, downloading and measuring performance in downloading the particular object from different sets of network hops corresponding to the default route and each route of the set of routes;
  reporting said performance measurements to a monitoring server for determining whether the default route is optimal relative to each route of the set of routes.

16. The method of claim 15, wherein the set of routes further comprises at least one peering route that is established with a neighboring AS for connecting in part the end user machine to the particular PoP.

17. The method of claim 15 further comprising submitting a set of requests for the particular object to the particular PoP, wherein each request of the set of requests comprises a different identified address to cause said particular object to be downloaded from the particular PoP using a different route of the set of routes.

18. The method of claim 15, wherein determining whether the default route is optimal relative to each route of the set of routes comprises determining whether latency for serving the particular object from the particular PoP to the end user machine using the default route is less than latency for serving the particular object from the particular PoP to the end user machine using any of the routes of the set of routes.

19. A monitoring system for monitoring route performance of a particular PoP of a CDN comprising a plurality of PoPs, said monitoring system comprising:
  a first server comprising a processor coupled to memory for serving to an end user machine, content that is embedded with monitoring code, the monitoring code (i) identifying a set of routes from which content can be served from the particular PoP to the end user machine and (ii) comprising sets of instructions causing the end user machine processing the content to measure performance for downloading a particular object from the particular PoP using each route of the set of routes and report said measurements to a second server, wherein the set of routes comprises routes of different transit providers and each route of the set of routes comprises a different set of network hops that are traversed in connecting in part the end user machine to the particular PoP; and
  a second server comprising a processor coupled to memory for (i) receiving said performance measurements that are reported by the end user machine, (ii) generating from said performance measurement, a performance report that identifies if a default route that is used to serve content from the particular PoP to the end user machine is optimal relative to other routes of the set of routes, and (iii) modifying a routing policy of the particular PoP to select a particular route from the set of routes that is not the default route for use in serving content from the particular PoP to the particular end user machine when the performance report identifies the particular route as optimal relative to the default route.

* * * * *